(12) United States Patent
Westhall et al.

(10) Patent No.: US 7,440,644 B2
(45) Date of Patent: Oct. 21, 2008

(54) OPTICAL FIBRE SENSOR ASSEMBLY

(75) Inventors: Jonathan James Westhall, Dorchester (GB); David John Hill, Dorchester (GB); William Malcolm Babb, Dorchester (GB); Philip John Nash, Dorchester (GB); Steven Robert Thomson, Dorchester (GB)

(73) Assignee: Qinetiq Limited (GB)

( * ) Notice: Subject to any disclaimer, the term of this patent is extended or adjusted under 35 U.S.C. 154(b) by 320 days.

(21) Appl. No.: 10/506,559

(22) PCT Filed: Mar. 3, 2003

(86) PCT No.: PCT/GB03/00874

§ 371 (c)(1),
(2), (4) Date: Sep. 2, 2004

(87) PCT Pub. No.: WO03/074981

PCT Pub. Date: Sep. 12, 2003

(65) Prior Publication Data

US 2005/0253049 A1   Nov. 17, 2005

(30) Foreign Application Priority Data

Mar. 5, 2002   (GB) ................................. 0205119.1

(51) Int. Cl.
G02B 6/00 (2006.01)
G01L 1/24 (2006.01)

(52) U.S. Cl. .............................. 385/13; 385/12; 73/800

(58) Field of Classification Search ................... 385/12, 385/13; 73/800

See application file for complete search history.

(56) References Cited

U.S. PATENT DOCUMENTS

| 4,547,869 | A |   | 10/1985 | Savit |
| 4,910,715 | A |   | 3/1990 | Savit |
| 5,475,216 | A | * | 12/1995 | Danver et al. .......... 250/227.14 |
| 5,625,724 | A | * | 4/1997 | Frederick et al. .............. 385/12 |
| 5,639,968 | A | * | 6/1997 | Bobb et al. ................... 73/800 |
| 6,118,733 | A |   | 9/2000 | Ames |
| 6,160,761 | A |   | 12/2000 | Sansone |
| 6,239,363 | B1 |   | 5/2001 | Wooters |

FOREIGN PATENT DOCUMENTS

| GB | 2124784 A | * | 2/1984 |
| GB | 2146447 |   | 4/1985 |
| GB | 2189110 |   | 10/1987 |
| WO | WO 00/62021 |   | 10/2000 |

* cited by examiner

*Primary Examiner*—Charlie Peng
(74) *Attorney, Agent, or Firm*—McDonnell Boehnen Hulbert & Berghoff LLP (57) ABSTRACT

An optical sensor assembly comprising a plurality of optical fibre sensor coils optically coupled by optical fibre; and an elongate support element, on which said plurality of optical fibre sensor coils and optically coupling optical fibre are mounted is disclosed. The support element has an elastic limit such that when said support element is bent from the elongate axis, the optical fibre fracture limit is reached before the elastic limit is reached. An array of these optical sensor assemblies, the mandrel on which the sensing coils are mounted and their method of manufacture are also disclosed.

28 Claims, 5 Drawing Sheets

OPTICAL FIBRE SENSOR ASSEMBLY

The present invention relates to optical fibre sensor assemblies, optical sensing arrays, their method of manufacture, and mandrels for mounting optical sensing coils and in particular, but not exclusively, to assemblies for optical hydrophones.

Optical hydrophone technology has been established now for approximately 15 years. The use of fibre optics has many advantages—fibre is small and lightweight, immune to electro-magnetic interference (EMI), electrically passive, capable of being used over long distances and it can be easily multiplexed.

Optical hydrophones operate on the principle that pressure changes caused by an acoustic signal such as a sound wave are converted into a strain in a coil of optical fibre. This strain imposes a change in the phase of an optical signal passed through the coil, due to the physical change in length of the fibre and the stress optic effect. The phase change can be detected by beating the signal with a reference signal of a slightly different frequency which, when mixed, produces a beat frequency, or heterodyne carrier, equal to the difference in frequency of these two signals. The acoustic signal will therefore appear as a phase modulation on this carrier. It is known to form arrays of such optical hydrophones, which may be optically addressed using a variety of multiplexing techniques, e.g. time division multiplexing (TDM), wavelength division multiplexing (WDM), etc. Such hydrophone arrays are well known and will therefore not be described. in detail herein. A more detailed explanation of the addressing of such arrays may be found in PCT Application PCT/GB00/01300, Publication Number WO 00/62021 assigned to "The Secretary of State for Defence (GB)".

To date both the US and the UK have successfully demonstrated optical fibre hydrophones for use in many underwater sensing applications and these have been shown to exhibit performances on a par with piezo-electric sensors—typically achieving Deep Sea State Zero (DSS0) noise performance up to in excess of 5 kHz.

Although optical fibre hydrophones have many advantages, optical fibres themselves are inherently fragile. Hydrophones are often used in harsh environments, for example in towed arrays. In these situations the most important factor that needs to be addressed is the mechanical survivability of the array of hydrophones. This is because of the deployed environment and the harsh way in which they are treated/handled. When deployed the array will see huge amounts of energy in the form of vibration transmitted to it down the tow cable and turbulence from the fact that it is travelling through the water. The handling consists of winching, de-tensioning and reeling plus the possibility of it laying around on the deck of a ship with the risk of it being kicked and trodden on. Add to this the enormous temperature range that the array will have to see, direct sunlight on the equator and the long, cold arctic nights, and you have a lot of danger to the integrity of the array.

Secondly there are spurious signals imparted onto the sensor by the noise sources within the array such as vibration and noise caused by the array passing through the water (flow noise).

All of the above dangers and noise sources need to be reduced through the mechanical design of the array. This is no mean feat when you consider how delicate optical fibre can be.

Figure 1A:
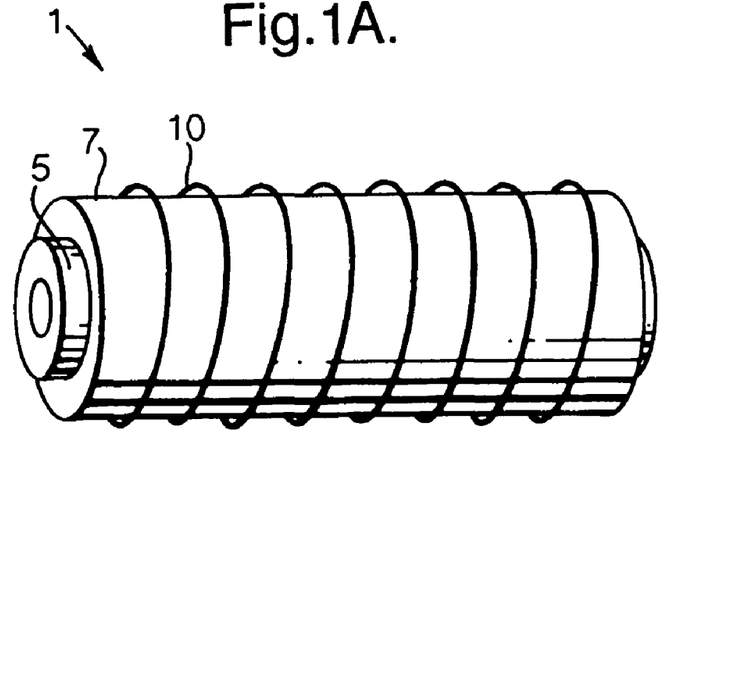
FIG. 1A shows a schematic representation of a fibre optic hydrophone.
Figure 1B:
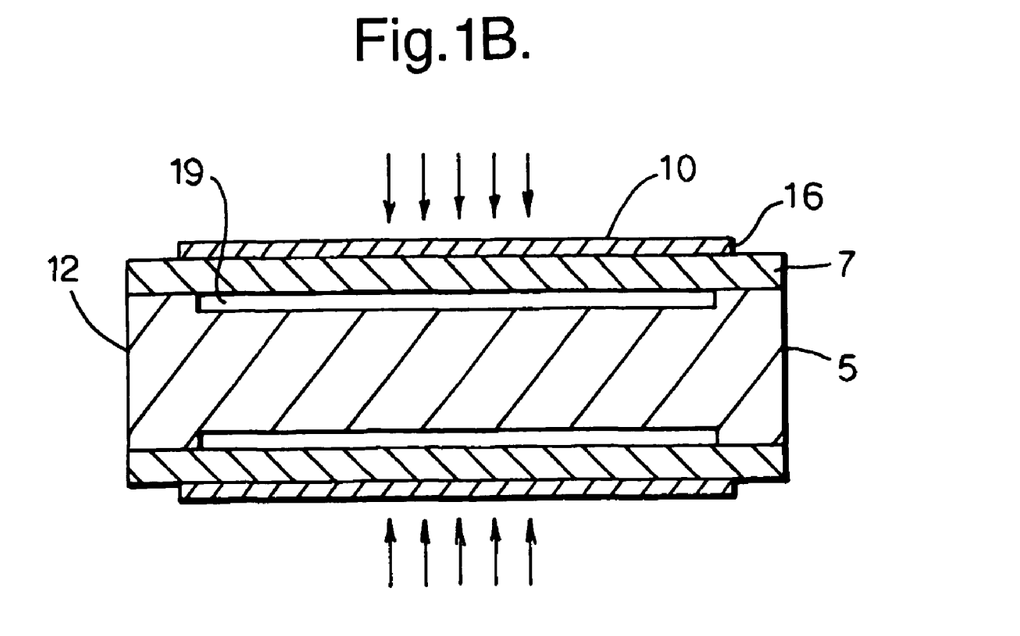
FIG. 1B shows a cross section of a conventional air-backed fibre optic hydrophone.

FIG. 1A shows a cross section of a known fibre optic hydrophone, and FIG. 1B shows a cross section of a known "air backed" fibre optic hydrophone. Air backed hydrophones comprise a fibre optic sensing coil 10 mounted on a mandrel comprising an inner rigid support member 5 and a flexible former 7. They have generally been formed in two parts of two different materials, so that an inner rigid member to give the mandrel rigidity could be used along with a more flexible former for mounting the optical sensing coil on. In order to increase sensitivity of the hydrophone to acoustic vibrations, there is an air gap 19 between the flexible former and its rigid support member. Conventionally this air gap is sealed by adhesives or by an interference fit between the former and the inner rigid support member.

A problem with this device when used in environments having changing external pressures and temperatures, such as in towed arrays, is that the flexible former, rigid support member and any adhesive between them tend to contract at different rates and this along with the fact that adhesives are often brittle can lead to the air gap not remaining pressure tight, which affects the readings of the hydrophone.

In addition to the use of individual hydrophones, it is known to use group hydrophones (see FIG. 3) and spatially extended hydrophones (see FIG. 4), these comprise an extended length hydrophone coil, connected either singly or in groups, to form a continuous acoustic aperture. The extended hydrophone length could be a maximum equal to the group length, but in practice an extended hydrophone group will probably comprise four coils.

The use of a plurality of optical fibre sensing coils making up a single hydrophone has the disadvantage that the fibre between the coils is sensitive to any kind of strain. This strain would be indistinguishable from a real acoustic signal on a single hydrophone. Also the twisting of the hydrophones relative to each other can snap the fibre at the point at which it exits the hydrophone.

U.S. Pat. No. 6,118,733 discloses an "interlink" for linking spatially extended hydrophones. The interlink links two hydrophones and has a helical spring like form, with the optical fibre linking the hydrophones passing along a helical groove on the interlink. A hydrophone is attached to either end of the interlink, typically by attaching the mandrel of the hydrophones to the interlink by epoxy. The optical fibre is held immobile on the flexible interlink and thus is protected from external forces. This design protects the optical fibre between hydrophones. It does, however, have the disadvantage of providing no protection to the hydrophone itself. Furthermore, a separate interlink needs to be attached for each additional hydrophone, which is fairly time consuming and expensive.

Typically, conventional piezo-electric hydrophones in towed arrays are connected together by cords.

According to a first aspect of the present invention, there is provided an optical sensor assembly comprising: a plurality of optical fibre sensor coils optically coupled by optical fibre; and an elongate support element, on which said plurality of optical fibre sensor coils and optically coupling optical fibre are mounted; wherein said support element has an elastic limit such that when said support element is bent away from the elongate axis, the optical fibre fracture limit is reached before the elastic limit is reached.

Connecting together a plurality of optical fibre sensor coils, has the advantage of allowing their construction to be performed in a single process, this is not only more efficient than a multi stage process but it also results in lower optical losses between the coils. However, this system does have an inherent problem in that the optical fibre coupling the sensing coils is particularly sensitive to external strains, which not only endangers the structural integrity of the system, but may also affect any optical signal being transmitted by the optical fibre.

This problem is addressed by mounting the coils and the coupling optical fibre on a single elongate support element, which acts to protects the optical fibre of the coil and the optical fibre connecting the coils from stress and strain. The elongate support element needs to be an elastic material such that it can be bent but will regain its elongate nature when the force is removed. The elastic limit of the support element is chosen such that when it is bent away from the elongate axis, the fracture limit of the optical fibre that it is supporting is reached before the elastic limit is reached. Thus, the optical fibre will fracture before the elastic limit of the support element is exceeded. This ensures, that provided the support element is not bent so much that the optical fibres mounted thereon will break, it will be within its elastic limit and thus, on removal of the bending force will substantially regain its elongate shape.

Advantageously, said support element has an elastic limit such that when said support element is bent away from the elongate axis around a curve having a radius of half a metre the support element elastic limit is not reached. In some embodiments of the invention, such as where the optical sensor assembly is a part of a towed array hydrophone, the support element needs to be flexible enough to be able to bend around a drum on which towed array hydrophones are generally mounted on board ship, but rigid enough to regain its shape when removed from the drum. The diameter of these drums is typically in the region of a metre.

Although the support element can take a plurality of different forms in preferred embodiments it comprises a flexible rod. A flexible rod may be a cheap and easy to handle structure, upon which it is simple to mount optical fibres and optical fibre sensing coils.

In preferred embodiments, said support element comprises a carbon fibre rod. The properties of carbon fibre have been found to be particularly suitable for this purpose. Furthermore, it is fairly cheap, robust and easy to handle.

In other embodiments said support element comprises a steel rod.

Although said plurality of optical fibre sensor coils may be arranged in a plurality of different configurations in preferred embodiments they are arranged optically in series with each other.

In preferred embodiments, said plurality of optical fibre sensor coils are mounted on said support element such that the distance between adjacent coils is substantially identical. The separation between the centre of the groups of sensing coils affects the frequency interrogated. By arranging the sensing coils on a support element which is substantially incompressible the distance between the coils is substantially invariant. this means that the centre of the group is fixed and it is thus, simpler to maintain a constant distance between the centres of different groups. The distance between group centres sets the upper interrogation frequency limit.

Preferably, said assembly further comprises a plurality of hollow mandrels corresponding to said plurality of optical fibre sensor coils, each of said mandrels having an internal and an external surface; wherein each of said plurality of optical fibre sensor coils is wound around said external surface of said corresponding mandrel, said plurality of optical fibre sensor coils being mounted on said support element by connecting a portion of said internal surface of said corresponding mandrel to said support element. Connecting the mandrel to the support element is a simple and effective way of mounting the hydrophone. The connection can be made directly by, for example, gluing the mandrel to the support element, or it may be made via connection means.

More preferably, said portion of said internal surface connected to said support element comprises a central portion of said internal surface substantially mid way between either end of said mandrel. The attachment of the central portion of the mandrel to the support element provides a symmetrical mounting arrangement and makes it less susceptible to vibrations in other parts of the assembly.

Although the mandrel could take a variety of forms, preferably it is cylindrical in shape.

Preferably, said mandrel comprises an inner member and an outer former; wherein said outer former is mounted via at least one compressible seal on said inner member such that there is a cavity between said outer former and said inner member, said compressible seal being significantly more compressible than said outer former or said inner member such that it is operable to seal said cavity across a range of temperatures and pressures. The use of a compressible seal enables the cavity to remain air tight across a range of temperature and pressures and thus, improves the accuracy of the device particularly in harsh environments such as in towed arrays.

In preferred embodiments, at least one portion of said support element comprises an external surface that is compressible. A compressible surface allows the coupling optical fibre mounted thereon to be decoupled from any vibrations travelling down the support element. Furthermore, it allows the optical fibre to be mounted on the support element under tension such that the material is compressed but not fully compressed. This eases the mounting procedure and also reduces any strain transfer from the support element to the optical fibre.

A simple way of producing an external compressible surface is to mount a compressible material to cover said at least one portion of said support element.

Preferably said at least one portion of said support element comprising a compressible external surface includes said portions of said support element between said plurality of optical fibre sensor coils. It is these portions on which said coupling optical fibre is mounted, and as it is this fibre that is particularly vulnerable and needs the extra protection of mounting on a compressible surface.

Preferably, said coupling optical fibre is wound around said compressible external surface of said support element. This arrangement provides a robust means of mounting the optical fibre. Winding the fibre too tightly on a non-compressible surface may lead to strain induced breakages. The use of a compressible surface enables the fibre to be wound upon the surface with some degree of give in the arrangement.

Advantageously, said assembly further comprises compressible material covering said optically coupling optical fibre and said compressible external surface. This compressible material provides protection for the coupling optical fibres.

Preferably there is a sheath of compressible material covering an outer envelope of said optical sensor assembly. This provides additional protection of the system and also protects the sensors from extraneous noise.

In preferred embodiments, said compressible material comprises open celled foam. Although it is possible to use closed celled foam, open celled is preferred as it can absorb fluids, such as buoyant fluids. Foam is a cheap, robust and readily available compressible material.

Preferably, said assembly further comprises a protective cover mounted to substantially surround an outer surface of each of said plurality of optical fibre sensing coils. More preferably the protective cover is mounted by attachment to said support element.

Covers are advantageous in that they impede objects from rubbing on the surface of the sensor coils and contributing to the noise signal. The covers also protect the sensor coils from external loads. In order to prevent vibrations from being transferred to the sensor coils the covers have to be mounted such that they don't come into contact with the sensor coils in any way. A simple way of doing this is to mount the covers on the support element.

Although the optical sensor assembly may comprise any number of optical fibre sensing coils, it has been found to be particularly effective to use four optical fibre sensor coils.

Figure 2:
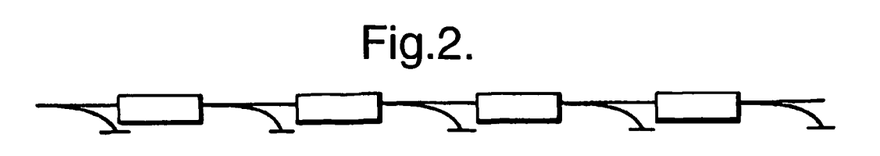
FIG. 2 shows a schematic representation of a plurality of point hydrophones mounted in series.
Figure 3:
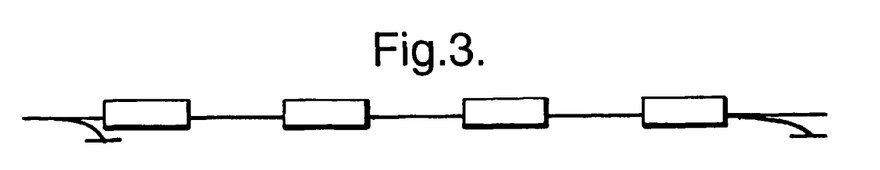
FIG. 3 shows a group hydrophone configuration.
Figure 4:
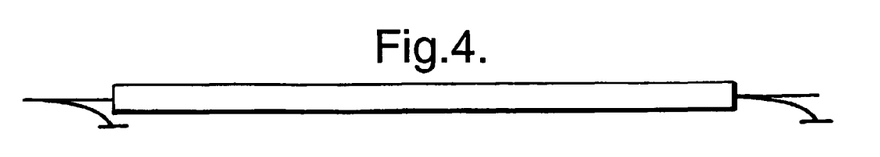
FIG. 4 shows an extended aperture hydrophone configuration.

Although the plurality of optical fibre sensing coils, may each comprise a single hydrophone (an arrangement such as is shown in FIG. 2) or they may comprise an extended aperture hydrophone (as is shown in FIG. 4), preferably said plurality of optical sensing coils comprise a single hydrophone. Generally, this would be in an arrangement as is shown in FIG. 3.

According to a second aspect of the present invention there is provided an optical sensing array comprising a plurality of optical sensor assemblies according to a first aspect of the present invention, said plurality of optical sensor assemblies being in optical communication with each other.

Although the plurality of optical sensor assemblies can be mechanically attached to one another by any means, a particularly cheap and effective way of doing it is to use cords.

Preferably, said sheath of compressible material covers said optical sensing array. By covering the whole array with compressible material, a degree of mechanical protection is provided to the array, along with a certain amount of acoustic insulation.

Advantageously, said array further comprises a protective cover, said array having a substantially cylindrical outer envelope and said protective cover being in the form of a hose. Mounting the whole array within a hose provides a degree of mechanical protection, and yet still provides some flexibility, the flexibility is required for the manipulation, such as mounting on drums typically having diameters of the order of a metre, the array.

In preferred embodiments said array further comprises a buoyant fluid confined within said hose. The hose also provides a containment vessel for a buoyant fluid, which can be introduced into the hose to provide neutral buoyancy for the device in water. The use of open celled foam as the compressible material allows the introduction of a substantial quantity of buoyant fluid such as kerosene.

According to a third aspect of the present invention, there is provided a mandrel for supporting an optical sensing coil, said mandrel comprising: an inner member; an outer former; and at least one compressible seal; wherein said outer former is mounted via said at least one compressible seal on said inner member such that there is a cavity between said outer former and said inner member, said compressible seal being significantly more compressible than said outer former or said inner member such that it is operable to seal said cavity across a range of temperatures and pressures.

In air-backed hydrophones of the prior art such as the hydrophone illustrated in FIG. 1B, the rigid inner member and flexible former have traditionally been joined by adhesive or by an interference fit. Traditionally, there has been a desire to provide a rigid seal between the two, this has been in line with the desire to provide a symmetrical hydrophone, a symmetrical arrangement being more resistant to extraneous influences. This desire for a rigid seal has led to the former being joined to the inner member by an interference fit or by an adhesive that has a compressibility that is similar to that of the former. A problem with rigid seals has been that in environments where external pressure and temperature are subject to change, such as in the towed array environment, the different rates of expansion and contraction of the former, inner support member and adhesive have caused the rigid seal of the air cavity to fail. The present invention addresses these problems by using a compressible seal, which has a compressibility which is significantly greater than that of the former of the inner member. This enables the seal to maintain its integrity across a range of temperature and pressure variations. In most embodiments the hydrophones are relatively small and any perceived problems due to lack of symmetry from the compressible seals have not emerged.

Although it is possible to seal the cavity with a single suitably shaped seal, it is generally preferable to use two compressible seals, one at either end of the cavity, the sidewalls of the cavity being formed by the inner member and former.

Advantageously said two compressible seals comprise O-rings. O-rings are a simple and effective way of sealing the cavity. Although the O-rings are smaller than traditional O-rings, preferably, having an external diameter of between 5 and 30 mm, they have been found to be very effective as seals.

In preferred embodiments said at least one compressible seal has a thickness of between 1 and 5 mm. This thickness of seal has been found to provide sufficient flexibility to maintain a good seal across a wide range of temperature and pressure variations.

Although the seal can be made from a variety of compressible and flexible materials, rubber has been found to be a particularly effective material for the seal.

Preferably, in order to hold the seal in place effectively, said inner member comprises two recesses, said two compressible seals being mounted within said two recesses.

In preferred embodiments said inner member is made of a substantially rigid material, preferably of metal.

Advantageously, said former is made of a flexible material, preferably of plastic. Plastic has been found to be particularly suitable material for making a former, it is cheap and easy to manufacture and it has the necessary flexibility and durability required.

According to a fourth aspect of the present invention there is provided a method of constructing an optical sensor assembly, comprising a first step of winding from a single piece of optical fibre, a plurality of optical fibre sensor coils with optically coupling optical fibre therebetween onto a support element; said support element having an elastic limit such that when said support element is bent away from the elongate axis, the optical fibre fracture limit is reached before the elastic limit is reached.

Constructing an optical sensor assembly comprising several sensors from a single piece of optical fibre has the advantages of ease of manufacture and low optical losses. Furthermore, mounting the sensors and optical coupling fibres on a support element provides mechanical stability to the device, which provides a degree of protection to the fibres from external stresses and strains which may not only cause damage to fibres, but also affect any optical signal passing along the fibre. It also aids in the construction, winding onto a single elongate support element being a fairly simple way of constructing the device.

Preferably, a plurality of hollow mandrels corresponding to said plurality of optical fibre sensor coils are mounted on said support element, said optical fibre sensor coils being wound onto said mandrels. Winding directly onto the support element or mandrels mounted on said support element, allows the device to be produced in one single efficient step.

Advantageously, said at least one portion of said support element includes said portions of said support element between said plurality of optical fibre sensor coils, said portion of said optical fibre optically coupling said optical fibre sensor coils being wound onto said compressible material under tension such that said compressible material is not totally compressed. In order to prevent the optical fibre from breaking when the support element about which it is wound bends, the optical fibre should be wound loosely. Given the extremely "springy" nature of the fibre this can be a difficult task. The use of a compressible material significantly eases the task, the fibre being wound under tension onto the compressible material thereby alleviating the problems due to the springiness of the fibre, while the fact that the material is not totally compressed gives the fibre some protection from the bending of the rod.

According to a further aspect of the present invention there is provided a method of constructing an optical sensing array comprising constructing a plurality of optical sensor assemblies according to a fourth aspect of the present invention, said method further comprising the steps of: linking said optical sensor assemblies together to form said sensor array; said linking being done mechanically by cord, and optically by optical fibres, said linking optical fibres being longer than said cord.

The compressible material mentioned in this application is in preferred embodiments foam and in more preferred embodiments open celled foam. However, any material that is sufficiently compressible such that an optical fibre being wound on the material under tension is sufficient to cause compression of the material would be suitable. The tension of winding is chosen such that the material is not fully compressed and thus, any strain transfer between the support element and the optical fibre is reduced.

Particular embodiments of the present invention will now be described by way of example only with reference to the accompanying drawings, of which.

Referring to FIG. 1A, there is shown a known optical hydrophone assembly 1. The hydrophone assembly 1 comprises a tubular mandrel with a former 7 mounted about an inner member 5. A hydrophone coil 10 comprising a coil of optical fibre is coiled around the former. In the assembly shown in FIG. 1 the coil 10 is represented schematically, and would in general consist of several layers of tightly wound optical fibre. In addition, before use, the hydrophone assembly may require waterproofing to protect the hydrophone elements, including elements internal to the hydrophone not shown in FIG. 1, from water damage.

It is known to use a plurality of hydrophones, such as that illustrated in FIG. 1, connected in series, as shown in FIG. 2. The hydrophones have dimensions comparable to the existing Benthos AQ4 hydrophone. This configuration requires one optical reflector for each coil.

An alternative arrangement, and one used in embodiments of this invention is shown in FIG. 3. Here a group of point hydrophones are connected in series to form a single array channel, with four point hydrophones. This configuration requires one optical reflector between every group of four hydrophones.

FIG. 4 shows an alternative arrangement comprising an extended aperture hydrophone. Extended aperture hydrophones may suffer from excessive acceleration sensitivity. The group hydrophone is a practical way of creating an extended hydrophone that alleviates this problem.

Figure 5:
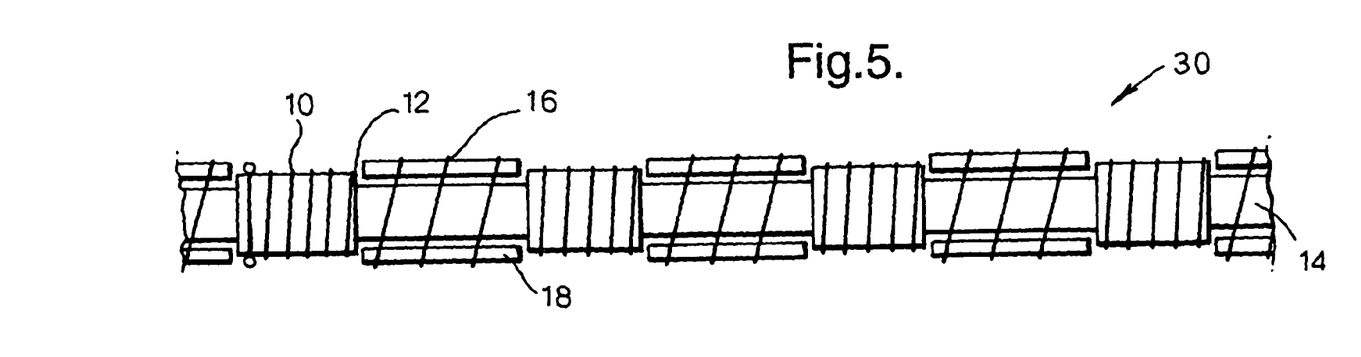
FIG. 5 shows an optical sensing assembly according to an embodiment of the present invention.

FIG. 5 shows an optical sensing assembly 30 according to an embodiment of the present invention. The sensing assembly comprises a plurality of fibre optic sensing coils 10, generally four, mounted on individual mandrels 12. The mandrels 12 are mounted on a flexible carbon fibre rod 14. Individual sensing coils 10 are coupled together by optical fibres 16. These fibres 16 are mounted on the flexible rod 12 by winding onto a compressible material 18 coating the section of the rod between the mandrels 12.

Figure 6A:
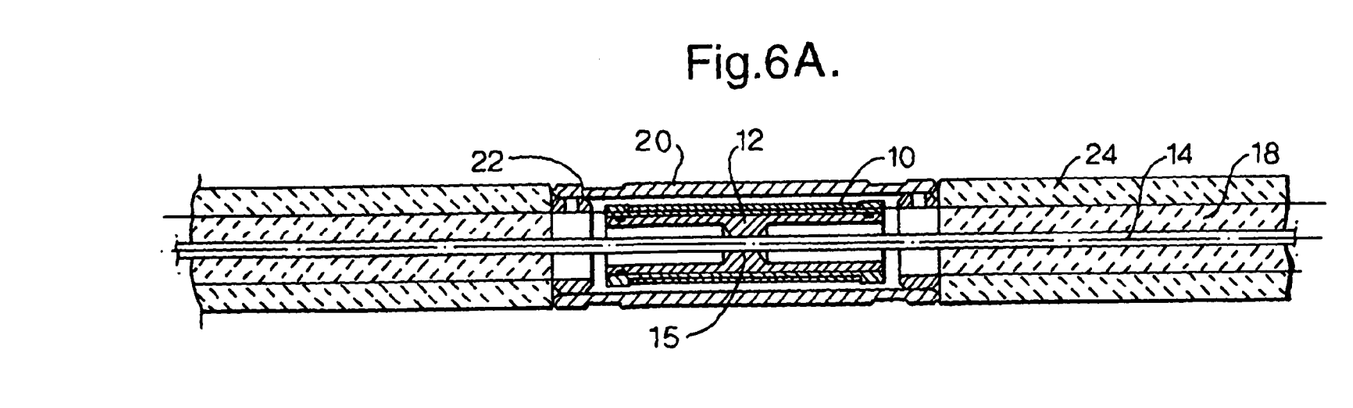
FIG. 6A shows a portion of the sensing assembly of FIG. 5 in more detail.

FIG. 6A shows a portion of the sensing assembly of FIG. 5 in more detail. It shows a mandrel 12 is attached to the rod 14 via a mounting point 15 located at its centre point. Mounting the mandrel 12 centrally provides a symmetrical arrangement and helps to isolate the mandrel 12 from vibrations passing along the rod 14. Each mandrel has a protective cover 20 mounted to cover the mandrels and protect the sensing coil 10, this protective cover is mounted on the rod via protective cover support elements 22. The rod thereby supports covers for the coils. These covers are needed to stop any external objects from rubbing on the surface of the coils and contributing to the noise signal. The covers also protect the coils from crushing loads. In order to inhibit vibrations from being transferred to the sensing coils, the covers have to be mounted such that they don't come into contact with the coils in any way. The covers are thus mounted on the central rod.

Foam 24 is used to cover the coupling fibres 16 (see FIGS. 5 and 6A) and thereby reduce flow noise and bulge waves that pass through a fluid filled array. This also protects the fibre from catching on any external strain members.

Figure 6B:
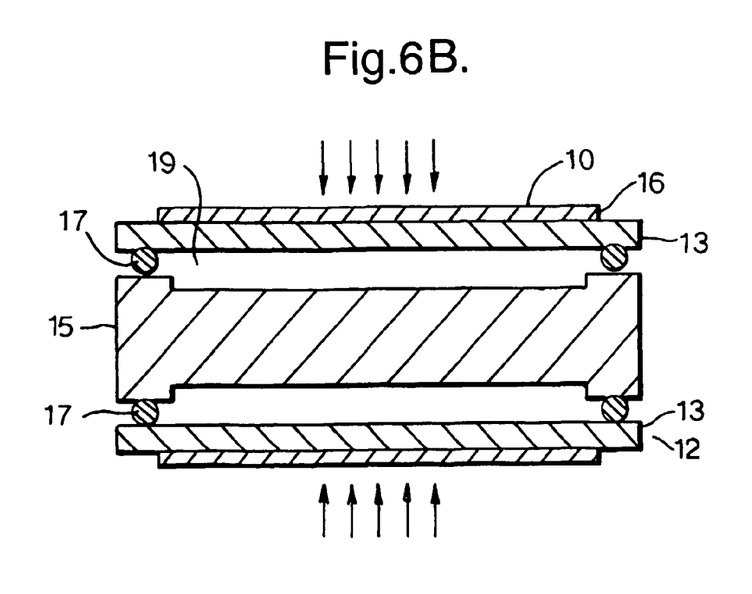
FIG. 6B shows an expanded view of the mandrel of FIG. 6A.

FIG. 6B shows an expanded view of the mandrel 12 of FIG. 6A. The mandrel 12 is formed of a former 13 and an inner support member 15. An O-ring 17 is located between the former 13 and inner support member 15, this O-ring acts to seal the air gap 19 that there is between the former 13 and inner member 15. The inner member 15 is formed of a substantially rigid material such as a metal, whereas the former 13 is formed of a material that has some flexibility, generally a plastic. Typically the inner member 15 is formed from aluminium or titanium, while the former 13 may be made of ABS, PVS or Delryn™. The inner member 15 provides the mandrel with the required stiffness and strength while the former 13 provides a flexible mounting for the optical sensing coil 10. The air gap increases the sensitivity of the hydrophone. The O-ring is generally made of rubber and is typically between 5 and 30 mm in diameter and between 1 and 5 mm thick.

Figure 7:
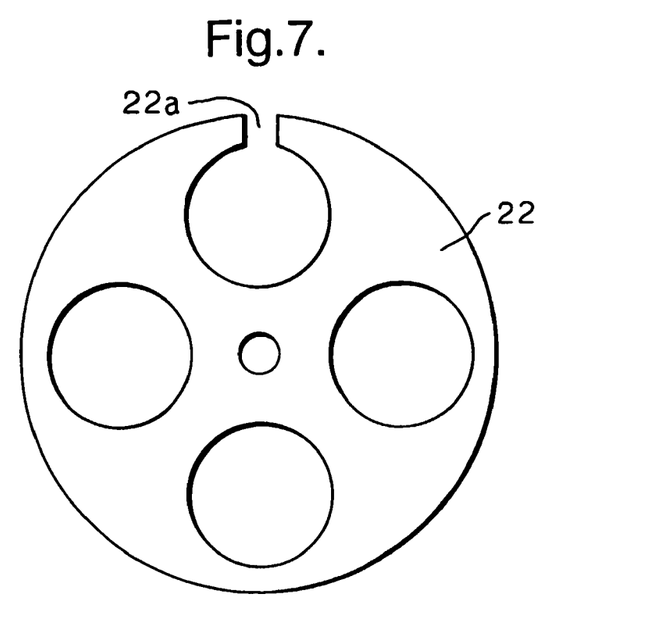
FIG. 7 shows a cross section of the protective cover support elements of FIG. 6A.

FIG. 7 shows a cross section of the protective cover support elements 22, with a cut 22a through which the optical fibre passes from the mandrel 12 to the foam 18 surrounding the rod.

Figure 8:
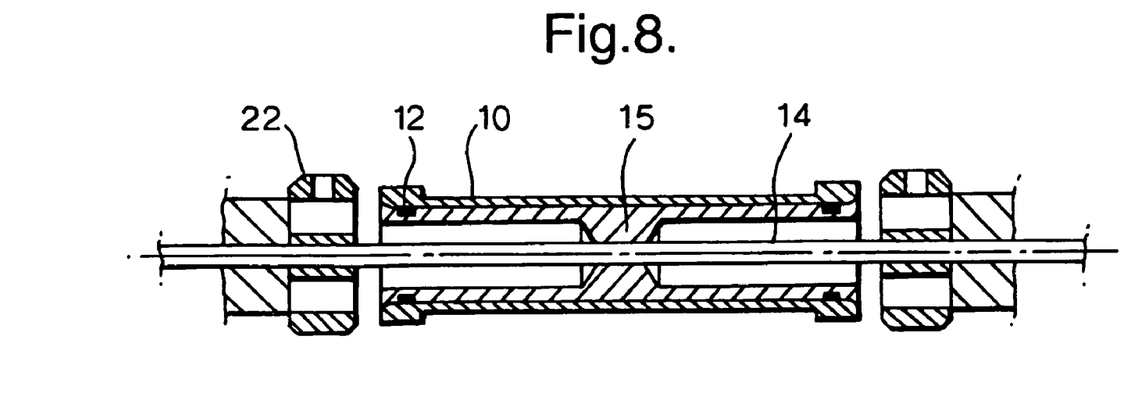
FIG. 8 shows a sensing coil mounted on a winding machine during fabrication.

FIG. 8 shows. a mandrel 12 mounted on a winding machine during fabrication. During fabrication the protective cover support elements 22 are used as steadies for the winding machine. The four optical sensing coils 10 and their connecting optical fibre 16 (see FIG. 5 and 6B) are wound in one go from a single piece of optical fibre. When the fibre is traversing between the single sensing coils it is coiled around the central rod. Under reeling the rod bends thus the fibre has to be loosely wound around the rod to avoid strain-induced breakage. The task of winding fibre loosely and in a controlled manner around a rod is a difficult task as fibre is extremely springy with it wanting to become straight. To get around this problem the fibre is wound under tension onto a foam such that the foam isn't totally compressed. This allows the fibre some degree of freedom to cope with any strain while still keeping it under held in position (see FIG. 5).

Figure 9:
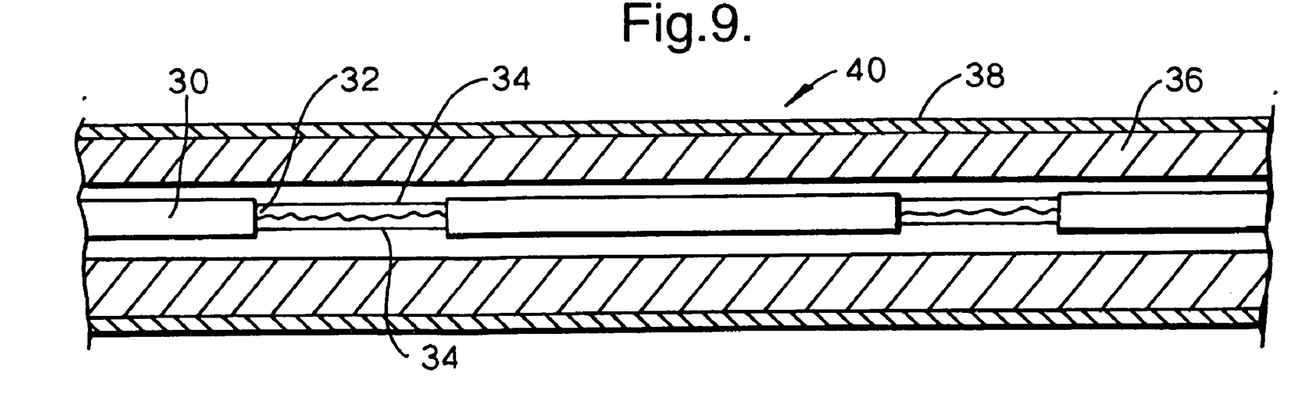
FIG. 9 shows an optical sensing array according to an embodiment of the present invention.

FIG. 9 schematically shows a portion of an optical sensing array according to an embodiment of the present invention. The optical sensing array 40 comprises a plurality of optical sensing assemblies 30 as illustrated in FIGS. 5 and 6 optically coupled together by optical fibre 32. They are further mechanically coupled using cords 34. There are generally two cords coupling the optical sensing assemblies, with optical fibres passing alongside them, the optical fibres being longer than the cords. A sheath of open celled foam 36 covers the whole assembly providing a degree of both mechanical and acoustic protection. The whole is then mounted within a waterproof hose 38 like construction. This may be in the form of a polyurethane casting. The hose construction offers further mechanical protection whilst allowing the array flexibility so that it can be wound around drums for storage and to allow it to be dispensed and retrieved from its sensing environment.

A waterproof hose is needed to protect the array from water as in preferred embodiments it is intended for underwater use. This use may be in saline water and saline water rapidly degenerates optical fibres, thus a waterproof covering is required. A further advantage of the waterproof hose is that may also be used to contain a fluid. Thus, a fluid can be introduced into the hose and can lie within the open cells of the foam and thereby make the device neutrally buoyant. A typical fluid to be used is kerosene.

Figure 10:
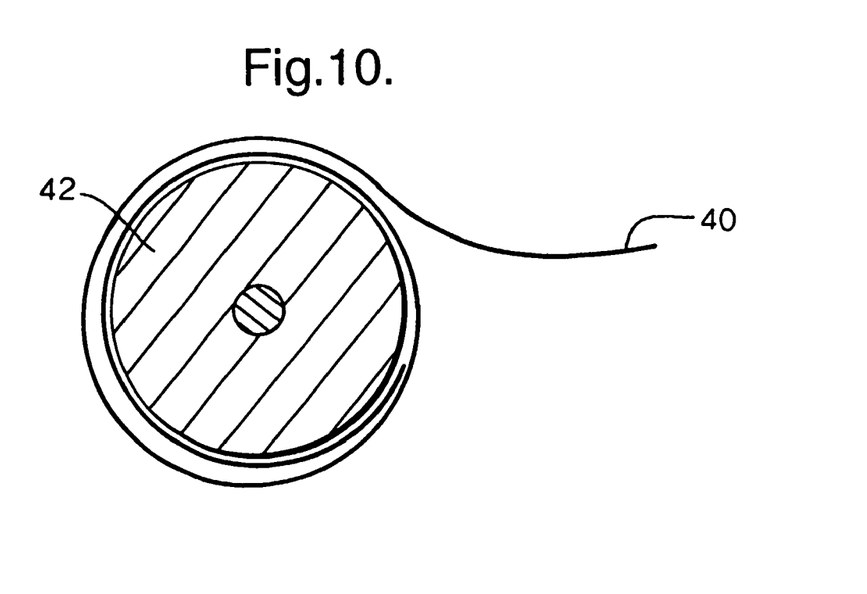
FIG. 10 shows a towed array hydrophone.

FIG. 10 shows a towed array hydrophone comprising an optical sensing array 40 according to an embodiment of the invention. The towed array hydrophone is mounted around a drum 42. The support elements for the optical sensing coils or hydrophones are flexible enough to bend around this drum. The elastic limit of the support elements is not reached when they are wound around the drum, thus, when the array is unwound from the drum the support elements and thus the array itself resumes its substantially elongate nature. The drum is typically of the order of a metre in diameter, although drums varying in diameter from 0.5 metre to 2 metres may be used.

The type of material that the support element is made from may be selected according to its proposed use, and factors such as the size of the drum it may be wound around. Furthermore, the nature of the optical fibre is selected according to the mechanical stresses it is to be subjected to and also the optical properties required. Typically the optical fibre has a diameter of 180 μm, while the support element is made of carbon fibre having a 2 mm diameter.

The invention claimed is:

1. An optical hydrophone assembly comprising:
a plurality of optical fibre hydrophone sensor coils, responsive to imposed strain to produce a change in phase of an optical signal passing therethrough, said hydrophone sensor coils being longitudinally spaced optically coupled by optical fibre; and
an elongate support element, on which said plurality of optical fibre sensor coils and optically coupling optical fibre are mounted; wherein said support element has an elastic limit such that when said support element is bent away from the elongate axis, the optical fibre fracture limit is reached before the elastic limit is reached.

2. An optical sensor assembly according to claim 1, said support element has an elastic limit such that when said support element is bent away from the elongate axis around a curve having a radius of half a metre the support element elastic limit is not reached.

3. An optical sensor assembly according to claim 1, wherein said support element is a flexible rod.

4. An optical sensor assembly according to claim 3, wherein said rod has a circular cross section.

5. An optical sensor assembly according to claim 3, wherein said support element comprises a carbon fibre rod.

6. An optical sensor assembly according to claim 3, wherein said support element comprises a steel rod.

7. An optical sensor assembly according to claim 1, wherein said plurality of optical fibre sensor coils are arranged optically in series with each other.

8. An optical sensor assembly according to claim 1, wherein said plurality of optical fibre sensor coils are mounted on said support element such that the distance between adjacent coils is substantially identical.

9. An optical sensor assembly according to claim 1, said assembly further comprising a plurality of hollow mandrels corresponding to said plurality of optical fibre sensor coils, each of said mandrels having an internal and an external surface; wherein each of said plurality of optical fibre sensor coils is wound around said external surface of said corresponding mandrel, said plurality of optical fibre sensor coils being mounted on said support element by connecting a portion of said internal surface of said corresponding mandrel to said support element.

10. An optical sensor assembly according to claim 9, wherein said portion of said internal surface connected to said support element comprises a central portion of said internal surface substantially mid way between either end of said mandrel.

11. An optical sensor assembly according to claim 9, wherein said mandrel is substantially cylindrical in shape.

12. An optical sensor assembly according to claim 9, wherein said mandrel comprises an inner member and an outer former; wherein said outer former is mounted via at least one compressible seal on said inner member such that there is a cavity between said outer former and said inner member, said compressible seal being significantly more compressible than said outer former or said inner member such that it is operable to seal said cavity across a range of temperatures and pressures.

13. An optical sensor assembly according to claim 1, at least one portion of said support element comprising an external surface that is compressible.

14. An optical sensor assembly according to claim 13, said compressible external surface of said support element comprising a compressible material mounted to cover said at least one portion of said support element.

15. An optical sensor assembly according to claim 13, wherein said at least one portion of said support element comprising a compressible external surface includes said portions of said support element between said plurality of optical fibre sensor coils.

16. An optical sensor assembly according to claim 15, wherein said optically coupling optical fibres are wound around said compressible external surface of said support element.

17. An optical sensor assembly according to claim 16, said assembly further comprising further compressible material covering said optically coupling optical fibre and said compressible external surface.

18. An optical sensor assembly according to claim 1, further comprising a sheath of compressible material covering an outer envelope of said optical sensor assembly.

19. An optical sensor assembly according to claim 14, wherein said compressible material comprises open celled foam.

20. An optical sensor assembly according to claim 1, said assembly further comprising a protective cover mounted to substantially surround an outer surface of each of said plurality of optical fibre sensing coils.

21. An optical sensor assembly according to claim 20, said protective cover being mounted by attachment to said support element.

22. An optical sensor assembly according to claim 1, said optical sensor assembly comprising four optical fibre sensor coils.

23. An optical sensor assembly according to claim 1, wherein said plurality of optical fibre hydrophone sensor coils form a single hydrophone.

24. An optical sensing array comprising a plurality of optical sensor assemblies as claimed in claim 1, said plurality of optical sensor assemblies being in optical communication with each other.

25. An optical sensing array according to claim 24, wherein said plurality of optical sensor assemblies are mechanically attached to one another by cords.

26. An optical sensing array according to claim 24, said array further comprising a protective cover, said array having a substantially cylindrical outer envelope and said protective cover being in the form of a hose.

27. An optical sensing array according to claim 26 said array further comprising a buoyant fluid confined within said hose.

28. An optical sensing array according to claim 27, wherein said buoyant fluid is kerosene.

* * * * *